(12) United States Patent
Tracy et al.

(10) Patent No.: US 7,518,568 B2
(45) Date of Patent: Apr. 14, 2009

(54) ANTENNA FOR AN ELECTRONIC DEVICE

(75) Inventors: Mark S. Tracy, Tomball, TX (US); Paul J. Doczy, Cypress, TX (US); Jonathan R. Harris, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 70 days.

(21) Appl. No.: 11/796,367

(22) Filed: Apr. 27, 2007

(65) Prior Publication Data

US 2008/0266201 A1    Oct. 30, 2008

(51) Int. Cl.
*H01Q 1/40* (2006.01)
(52) U.S. Cl. .................. 343/873; 343/702; 29/600; 427/77; 361/683

(58) Field of Classification Search ................ 343/702, 343/872, 873; 29/600; 427/77, 541; 361/683
See application file for complete search history.

(56) References Cited

U.S. PATENT DOCUMENTS

| 5,684,672 | A | 11/1997 | Karidis et al. |
| 6,428,738 | B1 | 8/2002 | Winget et al. |
| 6,620,371 | B1 | 9/2003 | Winget et al. |
| 2003/0043041 | A1* | 3/2003 | Zeps et al. ................ 340/573.1 |
| 2003/0222823 | A1* | 12/2003 | Flint et al. ................... 343/702 |
| 2006/0061512 | A1* | 3/2006 | Asano et al. ................. 343/702 |
| 2006/0210662 | A1 | 9/2006 | Winget et al. |
| 2008/0187651 | A1 | 8/2008 | Lee et al. |
| 2008/0286488 | A1 | 11/2008 | Li et al. |

* cited by examiner

*Primary Examiner*—Tho G Phan

(57) ABSTRACT

An electronic device comprises a housing having an antenna molded into the housing.

6 Claims, 4 Drawing Sheets

ANTENNA FOR AN ELECTRONIC DEVICE

BACKGROUND OF THE INVENTION

Electronic devices generally have a limited amount of space therein for various components. As a result, in order to accommodate the most functionality within a single electronic device, manufacturers of the electronic device are incorporating the smallest components with the maximum functionality. Typically, antennas in the electronic device are positioned in the top portion of the electronic device in order to maximize radio frequency connectivity. However, the antenna also uses valuable space in an already crowded location.

DETAILED DESCRIPTION OF THE DRAWINGS

FIGS. 1A through 1D illustrate an embodiment of an antenna 90 for an electronic device 100. In the illustrative embodiment, electronic device 100 is a laptop or notebook computer that comprises antenna 90 which is molded into a plastic enclosure 102 for electronic device 100. However, it should be understood that electronic device 100 may also be embodied as a cellular telephone, a personal digital assistant (PDA), a tablet computer, a gaming device, or any other type of electronic device configuration having wireless capability.

Figure 1A:
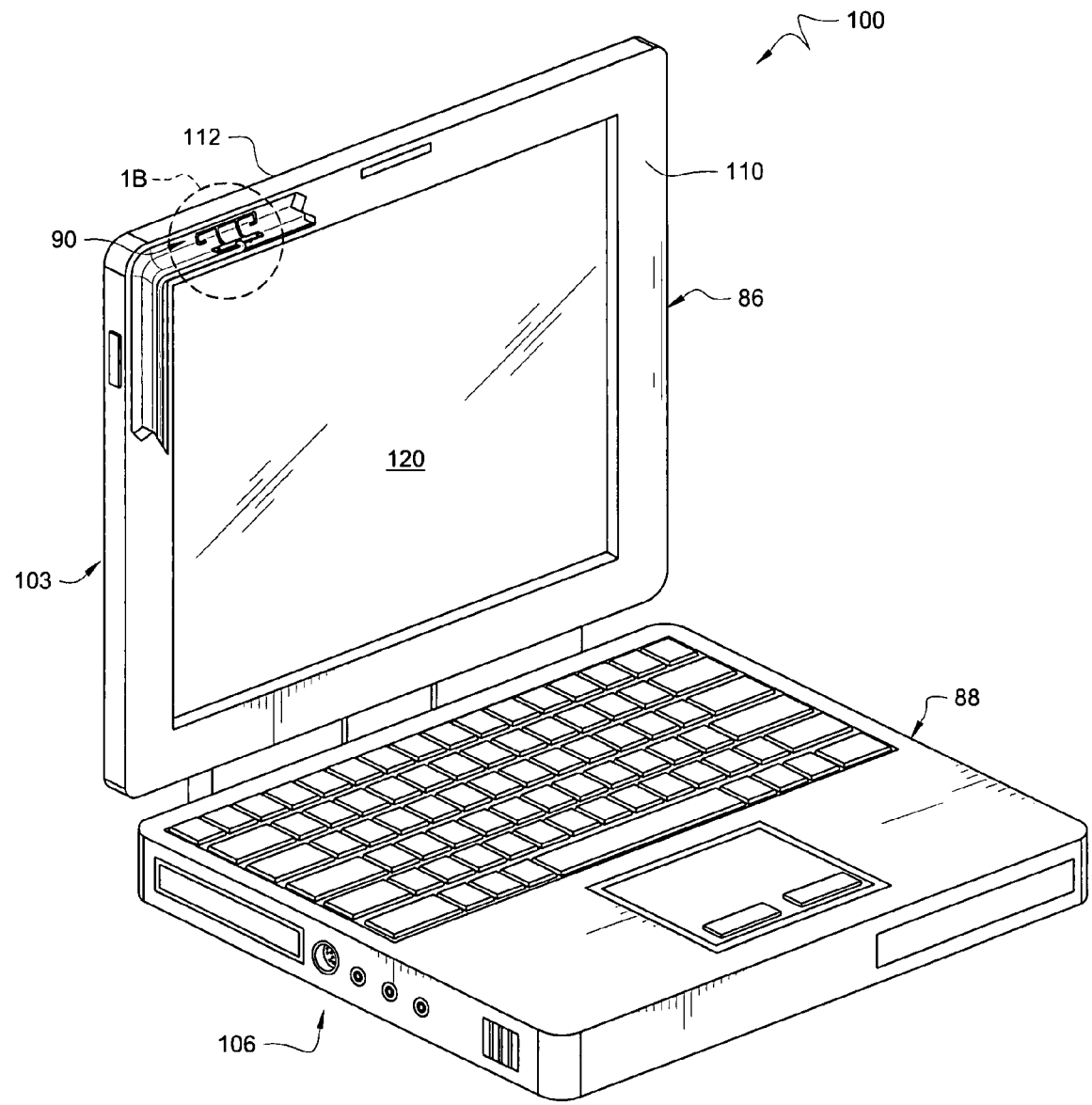
FIGS. 1A through 1D illustrate an electronic device in which an embodiment of an antenna is employed to advantage.

In the embodiment illustrated in FIG. 1A, electronic device 100 comprises a display member 103 rotatably coupled to a base member 106. Display member 103 and base member 106 each comprise a housing 86 and 88, respectively, for housing and/or supporting one or more components of electronic device 100. For example, in the illustrative embodiment, housing 86 comprises a top cover 110 and a back cover 112 for supporting a display screen 120. Base member 106 comprises cavities and interfaces for various user interface components (e.g. keyboard, mouse, and connections to other peripheral devices).

In the embodiment illustrated in FIG. 1A, antenna 90 is disposed in display member 103 and molded into a plastic portion of housing 86 (e.g. molded into back cover 112). However, it should be understood that antenna 90 may be otherwise located in electronic device 100 (e.g., alternately or additionally, in base member 106) and/or may be molded into a different portion of housing 86 and/or housing 88.

Figure 1B:
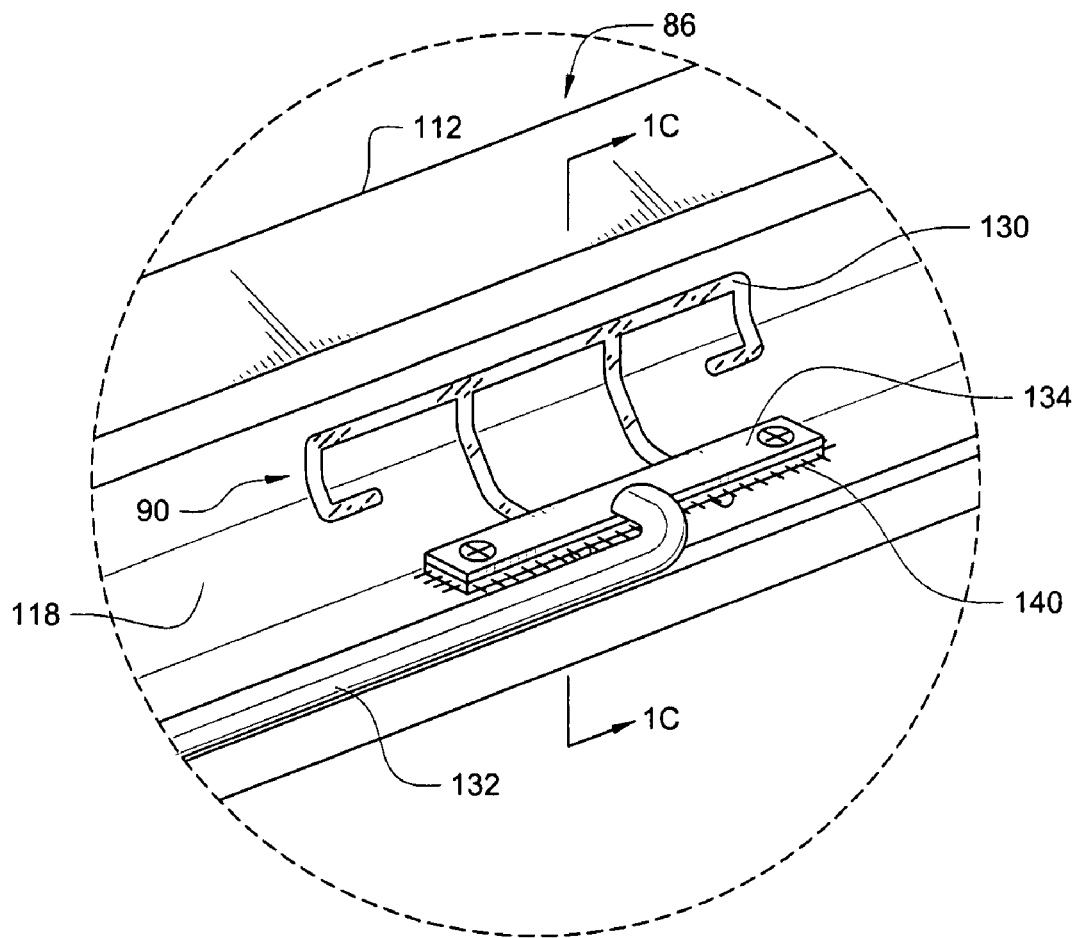

Referring to FIG. 1B, antenna 90 comprises an antenna ink 130 which is selected for receiving and transmitting an electronic signal. Antenna ink 130 can be any type of conductive metal, including but not limited to copper, tin, gold, aluminum, a metal alloy, or any combination thereof. Antenna 90 is formed by having antenna ink 130 molded into back cover 112 using an in-mold laminate process, also known as an in-mold foil process. In operation, a film or foil of antenna ink 130 is threaded inside the mold cavity of an injection molding tool. Thermoplastic elastomer is then injected into the mold cavity, and the injection molding tool applies pressure and heat to change the thermoplastic elastomer into a plastic component shaped according to the mold cavity (e.g., the shape of back cover 112). As the heat is applied, antenna ink 130 is transferred from the film to the thermoplastic elastomer forming back cover 112. In transferring, antenna ink 130 is either folded into the thermoplastic elastomer or applied to one edge or surface of back cover 112.

An antenna cable 132 connects antenna 90 to the wireless components for electronic device 100. In the illustrative embodiment, antenna cable 132 connects to antenna 90 using an antenna bracket 134. In some embodiments, antenna bracket 134 is a plastic or metal component which is screwed into or installed to back cover 112 of plastic enclosure 102. Alternatively, antenna bracket 134 can be snapped into back cover 112. Antenna bracket 134, in one embodiment, comprises a printed circuit board (PCB) 140 that conductively contacts antenna 90. PCB 140 enables an electronic signal to be received and transmitted from antenna 90 to the electronic processing components for electronic device 100. However, it should be understood that another conductive medium (e.g., an elastomeric conductive pad or spring contacts) can also be used in conjunction with PCB 140 to facilitate the passing of the electrical signal between antenna cable 132 and antenna 90. Furthermore, it should also be understood that any other device capable of transmitting an electronic signal between antenna 90 and the wireless components of electronic device 100 can be used.

In the illustrative embodiment, antenna 90 is molded into an internal edge or a surface 118 of back cover 112. However, it should be noted that antenna 90 can be molded into any internal or external edge or surface of housing 86 and/or housing 88 which enables a wireless electronic signal to be received and transmitted. Additionally, antenna 90 is not limited to a particular dimension or shape. Antenna ink 130 may be applied to a film or carrier in the molding process to form antenna 90 having any desired shape or size to provide a desired pattern for wireless communications.

Figure 1C:
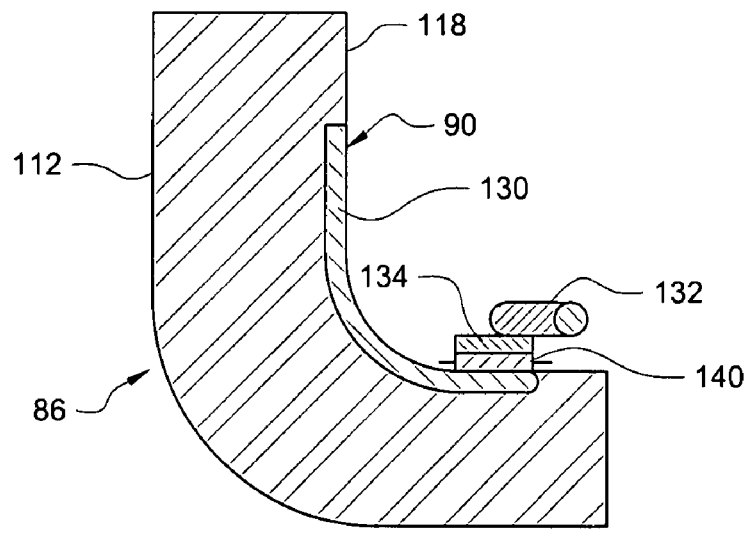

FIG. 1C is a cross-sectional view of antenna 90 taken along line 1C-1C of FIG. 1B. Referring to FIG. 1C, antenna ink 130 is molded into internal surface 118 of back cover 112 to form antenna 90. Antenna ink 130 is disposed in one contiguous section on surface 118 of back cover 112. However, it should be noted that, in some embodiments, antenna ink 130 may be unevenly molded into or dispersed in-between portions and pockets of the thermoplastic elastomer forming back cover 112. Additionally, in some embodiments, antenna ink 130 may be folded into back cover 112 such that portions of the thermoplastic elastomer overlay antenna ink 130 (e.g., such that at least a portion of antenna 90 is embedded at an intermediate depth within back cover 112). Furthermore, in FIG. 1C, PCB 140 is disposed on surface 118 of back cover 112 such that PCB 140 is in contact with antenna ink 130. PCB 140 connects to antenna bracket 134 which is coupled to antenna cable 132.

Figure 1D:
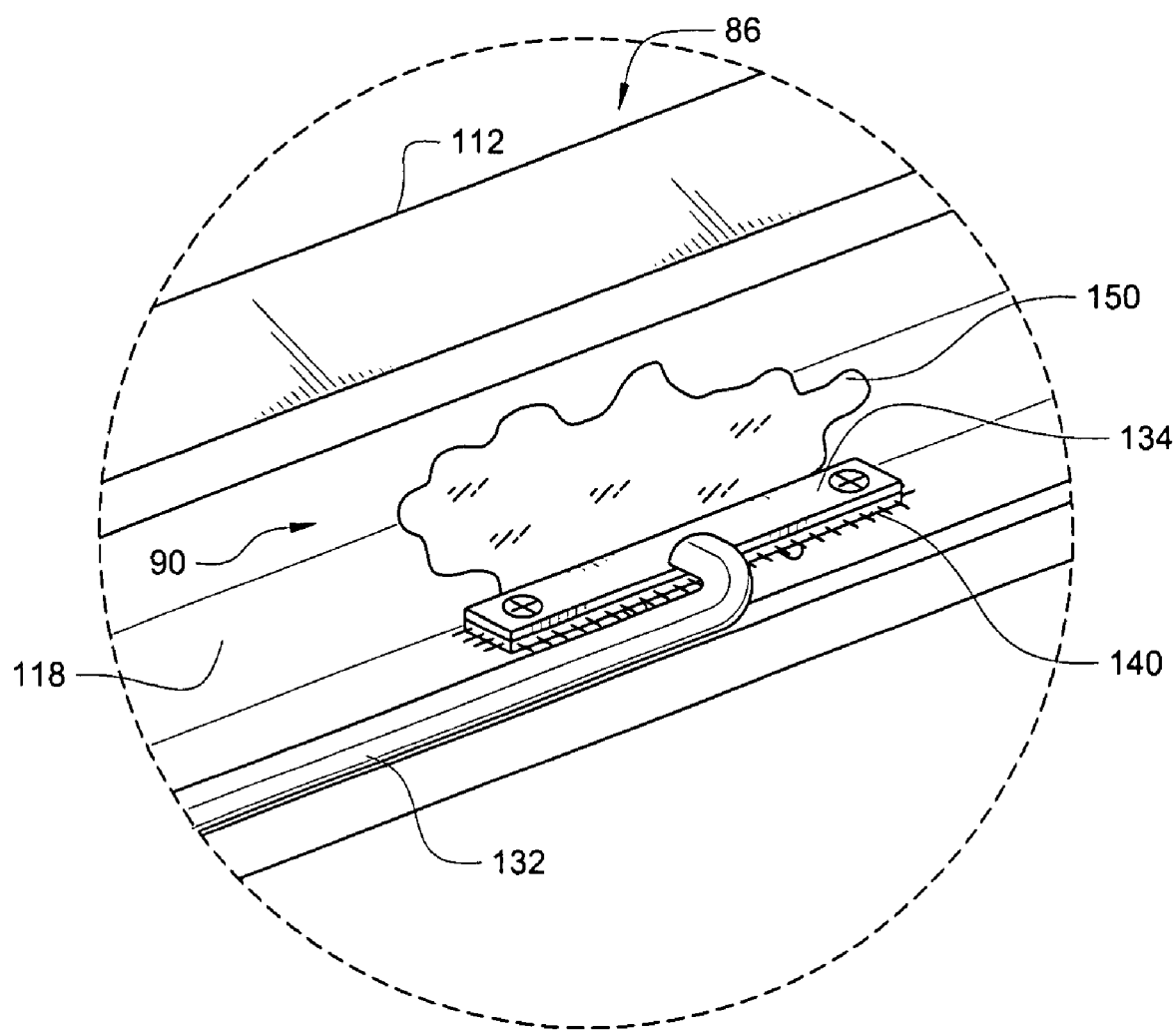

Referring to FIG. 1D, antenna 90 comprises a metal element 150 diffused/applied over, molded, and/or folded into or onto surface 118 of back cover 112. Metal element 150 may be one or a combination of materials comprising a density of metallic particles sufficient for receiving and transmitting an electronic signal. Metal element 150 may comprise any design and may be disposed in a contiguous section or unevenly dispersed in-between portions and pockets of the thermoplastic elastomer forming back cover 112.

Figure 2:
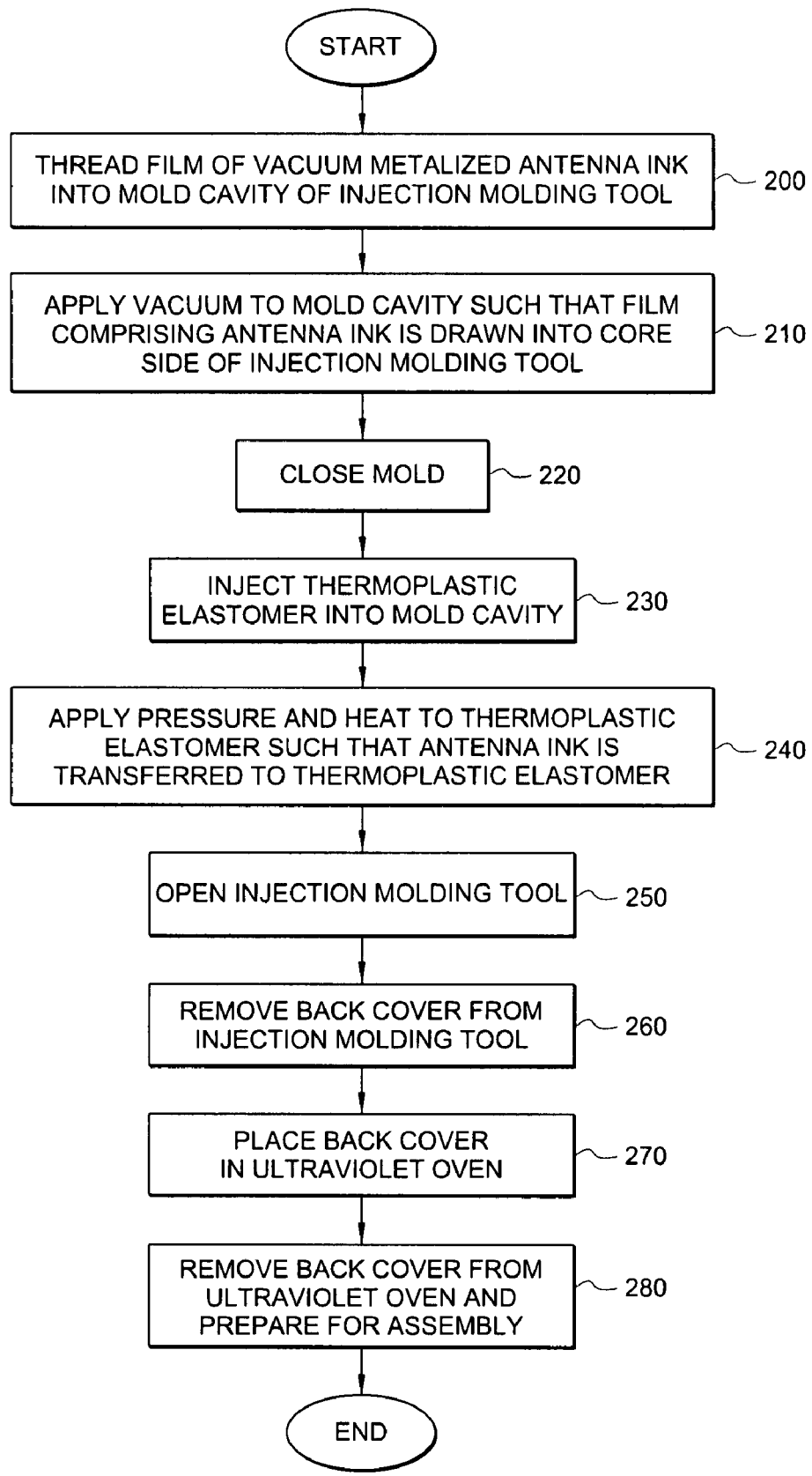
FIG. 2 is a flowchart illustrating an embodiment for a method of manufacturing an antenna for an electronic device.

FIG. 2 is a flowchart illustrating an embodiment for a method of manufacturing antenna 90 for electronic device 100. The method begins with block 200 in which a film comprising vacuum metalized antenna ink 130 is threaded into a mold cavity for an injection molding tool. Vacuum metallization is a process of applying a thin coat of metal to a plastic. Thus, in the illustrative embodiment, a thin coat of antenna ink 130 is vacuum metalized and applied to the film which is then threaded into the mold cavity. In this embodiment, the mold cavity is used to form at least a portion of back cover 112 for electronic device 100. It should be noted, however, that the mold cavity can be used to form any component for electronic device 100.

A vacuum is then applied to the mold cavity such that the film comprising antenna ink 130 is drawn into the core side of the injection molding tool (block 210). The core side is the female component of the mold cavity. The injection molding tool is then closed (block 220) and thermoplastic elastomer is injected into the mold cavity (block 230). Pressure and heat are then applied to the thermoplastic elastomer such that antenna ink 130 is transferred to the thermoplastic elastomer (block 240). Antenna ink 130 is either folded into or melted into the thermoplastic elastomer, thereby forming a permanent bond between the thermoplastic elastomer and antenna ink 130. Back cover 112 is then formed.

The injection molding tool is then opened (block 250) and back cover 112 is removed from the injection molding tool (block 260). Back cover 112 is then placed in an ultraviolet oven (block 270). Back cover 112 is then removed from the ultraviolet oven and prepared for further assembly in electronic device 100 (block 280). The method terminates thereafter.

Thus, the illustrative embodiments provide electronic device 100 and a method for manufacturing electronic device 100. Electronic device 100 comprises antenna 90 which is molded into a plastic housing for electronic device 100. Thus, embodiments of antenna 90 enable the space previously occupied by an antenna to be used for other components.

What is claimed is:

1. An electronic device, comprising:
   a housing having an antenna molded into the housing;
   the antenna comprising conductive metallic ink;
   the housing being a thermoplastic elastomer; and
   the conductive metallic ink being permanently bonded to the thermoplastic elastomer by a combination of pressure and heat after being threaded into a mold cavity for an injection molding tool as a film comprising vacuum metalized antenna ink.

2. A method for manufacturing an electronic device having an antenna molded into a housing of the electronic device, comprising:
   configuring an injection molding tool with a thermoplastic elastomer from which the housing is to be formed;
   threading a film comprising a vacuum metalized antenna ink into a mold cavity of the injection molding tool;
   applying a vacuum to the mold cavity to draw the film into the core side of the injection molding tool; and
   controlling the injection molding tool to apply a combination of temperature and heat sufficient to form a permanent bond between the antenna ink and the housing.

3. The method of claim 2, the vacuum metalized antenna ink being copper-based.

4. The method of claim 3, further comprising conductively coupling at least one cable to the antenna.

5. The method of claim 4, further comprising conductively coupling the at least one cable to the antenna via a printed circuit board.

6. The method of claim 2, the vacuum metalized antenna ink being based on one of copper, tin, gold, aluminum, and a metal alloy.

\* \* \* \* \*

UNITED STATES PATENT AND TRADEMARK OFFICE
CERTIFICATE OF CORRECTION

PATENT NO. : 7,518,568 B2  Page 1 of 1
APPLICATION NO. : 11/796367
DATED : April 14, 2009
INVENTOR(S) : Mark S. Tracy et al.

It is certified that error appears in the above-identified patent and that said Letters Patent is hereby corrected as shown below:

In column 4, line 2, in Claim 1, after "comprising" insert -- a --.

Signed and Sealed this

Third Day of November, 2009

David J. Kappos
*Director of the United States Patent and Trademark Office*